United States Patent Office 2,852,515
Patented Sept. 16, 1958

2,852,515

TERTIARY-AMINOALKYL SUBSTITUTED TETRAZOLES AND PREPARATION THEREOF

Bill Elpern, Albany, N. Y., assignor to Sterling Drug Inc., New York, N. Y., a corporation of Delaware No Drawing. Application January 13, 1954
Serial No. 403,919

23 Claims. (Cl. 260—247.5)

The invention relates to new and useful tetrazole derivatives and to their preparation. The invention particularly relates to tetrazoles having the formula

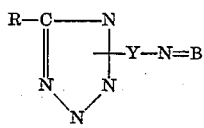

said formula containing an additional double bond in the ring in a position allylic to the side chain Y—N=B, and wherein R is a monocyclic group, Y is a lower-alkylene group and —N=B is an aliphatic type tertiary-amino group. The side chain, Y—N=B, can be present in either of two possible orientations in the tetrazole ring according to the following structures:

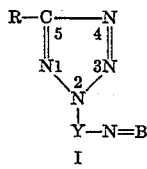

I and

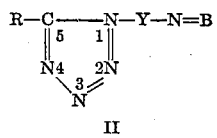

II

My new compounds possess useful pharmacological properties, and in particular exhibit antifibrillatory activity.

In the above general formulas the monocyclic group R can be a monocarbocyclic aryl group, a cyclohexyl group or a thienyl group. When R is a monocarbocyclic aryl group it is a radical of the benzene series and can be an unsubstituted phenyl group or a phenyl group substituted by one or more substituents inert to the basic condensing agents used in the process of preparing the compounds. Such inert substituents include nitro, halogen, lower-alkyl and lower-alkoxy groups. However, groups having a hydrogen capable of being replaced by a strongly electropositive metal, such as hydroxyl, mercapto, primary or secondary amino, and groups susceptible to reaction under the influence of basic condensing agents, such as cyano or acyloxy groups are not suitable as substituents in R. A preferred class of R, when monocarbocyclic aryl consists of phenyl and phenyl substituted by from one to three nitro, halogen, lower-alkyl or lower-alkoxy groups, and if more than one substituent is present they can be the same or different and in any of the various positions relative to one another. The halogen atoms can be any of the four halogens, fluorine, chlorine, bromine or iodine. The lower-alkyl and lower-alkoxy groups preferably have from 1 to about 4 carbon atoms and thus can be methyl, ethyl, propyl, isopropyl, butyl, isobutyl, methoxy, ethoxy, propoxy, isopropoxy, butoxy, isobutoxy, etc. The term lower-alkoxy is also intended to include the methylenedioxy group, —OCH$_2$O—, which, although divalent, can be readily classed with the monovalent alkoxy groups on the basis of its chemical properties. Specific examples of the group R, when monocarbocyclic aryl, include 2-nitrophenyl, 3-nitrophenyl, 4-nitrophenyl, 3,5-dinitrophenyl, 4-chlorophenyl, 3-bromophenyl, 2-chlorophenyl, 4-fluorophenyl, 4-iodophenyl, 3,4-methylenedioxyphenyl, 2-ethoxyphenyl, 3-propoxyphenyl, 4-butoxyphenyl, 3,4,5-trimethoxyphenyl, p-tolyl, 4-ethylphenyl, 3-butylphenyl, 3-nitro-4-methoxyphenyl, 3-bromo-5-nitrophenyl, 2-methoxy-4-bromophenyl, 3-nitro-5-methoxyphenyl, and the like. When R is a thienyl radical it can be either a 2-thienyl or a 3-thienyl radical. The thienyl radicals can likewise be substituted by one or more lower-alkyl, halogen or nitro groups; thus R can also represent such groups as 5-methyl-2-thienyl, 2-nitro-3-thienyl, 4-bromo-2-thienyl, 4,5-dichloro-2-thienyl and the like.

In the above general formulas the grouping Y represents a lower-alkylene radical in which the free valences are on different carbon atoms. In other words, the tertiary-amino group —N=B and the tetrazole nucleus are attached to different carbon atoms. The lower-alkylene bridge thus perforce contains at least two carbon atoms, and can contain as many as about four carbon atoms. The lower-alkylene radicals are straight or branched and include such radicals as ethylene, —CH$_2$CH$_2$—; 1,3-propylene, —CH$_2$CH$_2$CH$_2$—; 1,2-propylene, —CH(CH$_3$)CH$_2$—; 1,4-butylene,

—CH$_2$CH$_2$CH$_2$CH$_2$—

1,2-dimethylethylene, —CH(CH$_3$)CH(CH$_3$)—.

In the above general formulas, the tertiary-amino radicals —N=B include di-lower-alkylamino and saturated heterocyclic groups, in particular 1-piperidyl, 1-pyrrolidyl, 4-morpholinyl, and lower-alkylated derivatives thereof. The lower-alkylated heterocyclic groups include such groups as 2-methyl-1-piperidyl, 3-ethyl-4-morpholinyl and 2,5-dimethyl-1-pyrrolidyl. The term lower-alkyl includes alkyl radicals containing from 1 to about 6 carbon atoms, and in the di-lower-alkylamino radicals the lower-alkyl groups can be the same or different. Thus —N=B, when it represents a di-lower-alkylamino radical, includes such groups as dimethylamino, diethylamino, ethylmethylamino, dipropylamino, diisopropylamino, dibutylamino, dipentylamino and dihexylamino.

Compounds of the Formula I are prepared according to the following reaction:

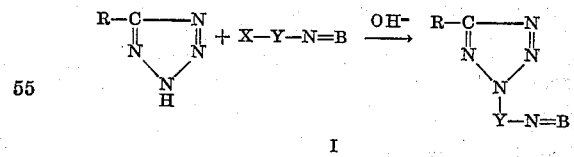

I wherein R, —N=B and Y have the same meanings as given above, and X is an acid radical derived by removal of an ionizable hydrogen from a strong acid, such as an inorganic mineral acid or an organic sulfonic acid. The group X can thus represent chlorine, bromine, iodine, sulfate, p-toluenesulfonate and the like. The starting materials, the 5-cyclic-substituted tetrazoles, are old compounds as a class, and any new species which may be desired can be prepared by methods analogous to those shown in the prior art. The 5-cyclic-substituted tetrazoles react readily with the tertiary-aminoalkyl halide in the presence of a strong basic condensing agent, such as an alkali metal hydroxide or alkoxide, to produce the desired compounds of Formula I. It is possible that in this reaction a small quantity of product corresponding to Formula II is produced, however no attempt was made to isolate this isomer which instead was prepared by an alternative procedure as described below.

The compounds of Formula II are prepared according to the following series of reactions:

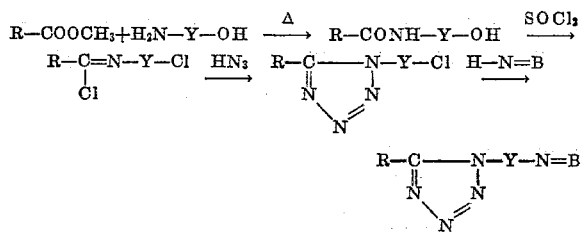

wherein R, —N=B and Y have the same meanings as described above. The methyl ester of a cyclic carboxylic acid is condensed with a primary-amino alkanol to give the corresponding N-hydroxyalkyl substituted carboxylic acid amide. The latter when treated with thionyl chloride gives an N-(2-chloroethyl)imidyl chloride which with hydrazoic acid is converted to a 1-chloroalkyl-5-substituted tetrazole. The latter can then be condensed with any desired secondary amine to produce the compounds of Formula II. In carrying out the above series of reactions it is preferred that the group R be a carbocyclic aryl group or an aromatic type heterocyclic group such as thienyl. If compounds of Formula II where R is cyclohexyl are desired these can be obtained by catalytic reduction of the corresponding compounds where R is phenyl.

The compounds of Formulas I and II, when in the free base form, are in general water-insoluble liquid substances and are therefore most conveniently prepared and used in the form of crystalline, water-soluble acid-addition or quaternary ammonium salts, and these salts are also within the purview of the invention. The acids which can be used to prepare acid-addition salts are preferably those which produce when combined with the free base, salts whose anions are relatively innocuous to the animal organism in therapeutic doses of the salts, so that the beneficial physiological properties inherent in the free base are not vitiated by side effects ascribable to the anions. Appropriate acid-addition salts are those derived from mineral acids such as hydrochloric acid, hydrobromic acid, hydriodic acid, nitric acid, phosphoric acid and sulfuric acid; and organic acids such as acetic acid, citric acid, tartaric acid, lactic acid, and the like, giving the hydrochloride, hydrobromide, hydriodide, nitrate, phosphate or acid phosphate, sulfate or bisulfate, acetate, citrate or acid citrate, tartrate or bitartrate, and lactate salts, respectively. The quaternary ammonium salts are obtained by the addition to the free base of alkyl or aralkyl esters of inorganic acids or organic sulfonic acids, including such compounds as methyl chloride, methyl bromide, methyl iodide, ethyl bromide, propyl bromide, benzyl chloride, benzyl bromide, methyl sulfate, methyl benzenesulfonate, and methyl p-toluene-sulfonate, giving the methochloride, methobromide, methiodide, ethobromide, propobromide, benzochloride, benzobromide, methosulfate, methobenzenesulfonate and metho-p-toluenesulfonate salts, respectively.

The following examples will further illustrate the invention.

EXAMPLE 1

*2-(2-dimethylaminoethyl)-5-phenyltetrazole*

5-phenyltetrazole (7.3 g., 0.05 mole) and 7.2 g. (0.05 mole) of 2-dimethylaminoethyl chloride hydrochloride were suspended in 80 ml. of acetone. Sodium hydroxide (8.4 g., 0.21 mole) in 7.5 ml. of water was added all at once, and the mixture was stirred and refluxed for one hour. Water (50 ml.) was then added and the mixture extracted with benzene. The solvent was removed from the benzene extract, and the residual oil (7 g. of 2-(2-dimethylaminoethyl)-5-phenyltetrazole) was divided into two parts, one of which was converted into the hydrochloride salt form and the other into the methiodide salt form as described below.

A 3.5 g. portion of the free base form of 2-(2-dimethylaminoethyl)-5-phenyltetrazole was dissolved in 50 ml. of ether and the solution was treated with alcoholic hydrogen chloride until precipitation was complete. The solid product was collected by filtration and dried, giving 3.5 g. of 2-(2-dimethylaminoethyl)-5-phenyltetrazole in the form of the hydrochloride salt, M. P. 213.5–214° C., when recrystallized from isopropyl alcohol.

*Analysis.*—Calcd. for $C_{11}H_{16}ClN_5$: C, 52.06; H, 6.36; N, 27.61. Found: C, 52.33; H, 6.15; N, 27.85.

A 3.5 g. portion of the free base form of 2-(2-dimethylaminoethyl)-5-phenyltetrazole and 5 cc. of methyl iodide in 25 ml. of ethyl acetate were refluxed for three hours. The reaction mixture was cooled, and the solid product collected by filtration and dried, giving 5 g. of 2-(2-dimethylaminoethyl)-5-phenyltetrazole in the form of its methiodide salt, M. P. 234.5–240° C. when recrystallized from water. Acetone can be used in place of ethyl acetate as solvent in the quaternization reaction.

*Analysis.*—Calcd. for $C_{12}H_{18}IN_5$: N, 19.50; I, 35.33. Found: N, 19.21; I, 35.20.

EXAMPLE 2

2-[2-(piperidyl)ethyl]-5-phenyltetrazole was prepared from 7.3 g. of 5-phenyltetrazone and 9.2 g. of 2-(1-piperidyl)ethyl chloride hydrochloride and converted to the hydrochloride and methiodide salt forms by the manipulative procedures described above in Example 1.

2-[2-(1-piperidyl)ethyl]-5-phenyltetrazole in the form of its hydrochloride salt had the M. P. 219–221.5° C. when recrystallized from isopropyl alcohol.

*Analysis.*—Calcd. for $C_{14}H_{20}ClN_5$: N, 23.84; Cl, 12.01. Found: N, 23.78; Cl, 12.00.

2-[2-(1-piperidyl)ethyl]-5-phenyltetrazole hydrochloride was found to possess the ability to eliminate fibrillation in the isolated rabbit heart at non-toxic levels.

2-[2-(1-piperidyl)ethyl]-5-phenyltetrazole in the form of the methiodide salt had the M. P. 170–173° C. when recrystallized from isopropyl alcohol.

*Analysis.*—Calcd. for $C_{15}H_{22}IN_5$: N, 17.55; I, 31.79. Found: N, 17.62; I, 31.60.

EXAMPLE 3

2-(2-diethylaminoethyl)-5-phenyltetrazole was prepared from 7.3 g. of 5-phenyltetrazole and 13.6 g. of 2-diethylaminoethyl bromide hydrobromide, and converted to the hydrochloride and methiodide salt forms by the manipulative procedures described above in Example 1.

2-(2-diethylaminoethyl)-5-phenyltetrazole in the form of the hydrochloride salt had the M. P. 126–127.5° C. when recrystallized from isopropyl alcohol.

*Analysis.*—Calcd. for $C_{13}H_{20}ClN_5$: N, 24.85; Cl, 12.58. Found: N, 25.04; Cl, 12.61.

2-(2-diethylaminoethyl)-5-phenyltetrazole hydrochloride was found to possess the ability to eliminate fibrillation in the isolated rabbit heart, and by intramuscular injection in the living rabbit, at non-toxic levels.

2-(2-diethylaminoethyl)-5-phenyltetrazole in the form of the methiodide salt had the M. P. 132–133.5° C. when recrystallized from ethanol.

*Analysis.*—Calcd. for $C_{14}H_{22}IN_5$: C, 43.42; H, 5.73; I, 32.78. Found: C, 43.51; H, 5.75; I, 32.42.

EXAMPLE 4

2-[2-(4-morpholinyl)ethyl]-5-phenyltetrazole was prepared from 7.3 g. of 5-phenyltetrazole and 9.3 g. of 2-(4-morpholinyl)ethyl chloride hydrochloride, and converted into the hydrochloride and methiodide salt forms by the manipulative procedures described above in Example 1.

2-[2-(4-morpholinyl)ethyl]-5-phenyltetrazole in the form of the hydrochloride salt had the M. P. 212.5–

214° C. when recrystallized first from isopropyl alcohol and then from ethanol.

*Analysis.*—Calcd. for $C_{13}H_{18}ClN_5O$: N, 23.69; Cl, 11.99. Found: N, 23.69; Cl, 12.21.

2-[2-(4-morpholinyl)ethyl]-5-phenyltetrazole hydrochloride was found to possess the ability to eliminate fibrillation in the isolated rabbit heart at non-toxic levels.

2-[2-(4-morpholinyl)ethyl]-5-phenyltetrazole in the form of the methiodide salt had the M. P. 221–221.5° C. when recrystallized from water.

*Analysis.*—Calcd. for $C_{14}H_{20}IN_5O$: N, 17.46; I, 31.63. Found: N, 17.59; I, 31.62.

EXAMPLE 5

2-(3-dimethylaminopropyl)-5-phenyltetrazole

Sodium hydroxide (25 ml. of 35% aqueous solution) was added dropwise with stirring to a suspension of 7.3 g. of 5-phenyltetrazole and 7.5 g. of 3-dimethylaminopropyl chloride hydrochloride in 80 ml. of acetone. When the heat of reaction had subsided, the mixture was refluxed on a steam bath for seven hours. Water (20 cc.) was then added and the mixture was extracted with benzene. The benzene solution was concentrated and the residue distilled. A fraction of 3.5 g. of 2-(3-dimethylaminopropyl)-5-phenyltetrazole was collected at 157–163° C. (0.5 mm.). The free base form was converted to the hydrochloride and methiodide salt forms by the manipulative procedures described above in Example 1.

2-(3-dimethylaminopropyl)-5-phenyltetrazole in the form of the hydrochloride salt had the M. P. 165.5–167° C. when recrystallized from isopropyl alcohol.

*Analysis.*—Calcd. for $C_{12}H_{18}ClN_5$: C, 53.86; H, 6.77; Cl, 13.25. Found: C, 53.97; H, 6.73; Cl, 13.00.

2 - (3 - dimethylaminopropyl) - 5 - phenyltetrazole in the form of the methiodide salt had the M. P. 198.5–200° C. when recrystallized from an isopropyl alcohol-ethyl alcohol mixture.

*Analysis.*—Calcd. for $C_{13}H_{20}IN_5$: C, 41.83; H, 5.40; I, 34.00. Found: C, 41.79; H, 5.58; I, 33.94.

EXAMPLE 6

2 - (2 - dimethylaminoethyl) - 5 - cyclohexyltetrazole was prepared from 7.6 g. of 5-cyclohexyltetrazole and 7.2 g. of 2-dimethylaminoethyl chloride hydrochloride, and converted to the hydrochloride and methiodide salt forms by the manipulative procedures described above in Example 1.

2 - (2 - dimethylaminoethyl) - 5 - cyclohexyltetrazole in the form of the hydrochloride salt had the M. P. 190–191.5° C. when recrystallized from isopropyl alcohol.

*Analysis.*—Calcd. for $C_{11}H_{22}ClN_5$: N, 26.96; Cl, 13.65. Found: N, 26.97; Cl, 13.36.

2 - (2 - dimethylaminoethyl) - 5 - cyclohexyltetrazole in the form of the hydrochloride salt had the M. P. 206–207° C. when recrystallized from ethanol.

*Analysis.*—Calcd. for $C_{12}H_{24}IN_5$: C, 39.45; H, 6.62; I, 34.74. Found: C, 39.28; H, 6.47; I, 34.62.

EXAMPLE 7

2 - (2 - dimethylaminoethyl) - 5 - (2 - thienyl)tetrazole was prepared from 7.6 g. of 5-(2-thienyl)tetrazole and 7.2 g. of dimethylaminoethyl chloride hydrochloride, and converted to the hydrochloride and methiodide salt forms by the manipulative procedures described above in Example 1. The free base was distilled at 158–161° C. (1 mm.).

2 - (2 - dimethylaminoethyl) - 5 - (2 - thienyl)tetrazole in the form of the hydrochloride salt had the M. P. 211–212° C. when recrystallized from ethanol.

*Analysis.*—Calcd. for $C_9H_{14}ClN_5S$: C, 41.61; H, 5.43; S, 12.34. Found: C, 41.64; H, 5.24; S, 12.13.

2 - (2 - dimethylaminoethyl) - 5 - (2 - thienyl)tetrazole in the form of the methiodide salt had the M. P. 238–240° C. when recrystallized from dilute ethanol.

*Analysis.*—Calcd. for $C_{10}H_{16}IN_5S$: N, 19.18; I, 34.75. Found: N, 19.24; I, 34.45.

EXAMPLE 8

2 - (2 - dimethylaminoethyl) - 5 - (3 - thienyl)tetrazole was prepared from 7.6 g. of 5-(3-thienyl)tetrazole and 7.2 g. of 2-dimethylaminoethyl chloride hydrochloride, and converted to the hydrochloride and methiodide salt forms by the manipulative procedures described above in Example 1. The free base was distilled at 150–165° C. (1–2 mm.).

2 - (2 - dimethylaminoethyl) - 5 - (3 - thienyl)tetrazole in the form of the hydrochloride salt had the M. P. 219.5–221° C. when recrystallized several times from ethyl alcohol and then from a methyl alcohol-isopropyl alcohol mixture.

*Analysis.*—Calcd. for $C_9H_{14}ClN_5S$: C, 41.61; H, 5.43; S, 12.34. Found: C, 41.74; H, 5.40; S, 12.44.

2 - (2 - dimethylaminoethyl) - 5 - (3 - thienyl)tetrazole in the form of the methiodide salt had the M. P. 234–235° C.

*Analysis.*—Calcd. for $C_{10}H_{16}IN_5S$: C, 32.88; H, 4.42; I, 34.75. Found: C, 32.88; H, 4.12; I, 34.97.

EXAMPLE 9

(a) Methyl 3,4-methylenedioxyphenylimidate

Piperonylonitrile (3,4-methylenedioxybenzonitrile) (49 g.) was dissolved in 200 ml. of benzene, 14 ml. of methanol was added and the solution was saturated with hydrogen chloride gas while the temperature of the solution was maintained at 0–5° C. The reaction mixture was allowed to stand at room temperature for about 3 days and the crystalline product was collected by filtration and washed with ether, giving 65 g. of methyl 3,4-methylenedioxyphenylimidate hydrochloride

M. P. 162–163° C.

(b) 5-(3,4-methylenedioxyphenyl)tetrazole

Methyl 3,4-methylenedioxyphenylimidate (67.5 g.) was added to a cooled solution of hydrazine prepared from 39 g. of hydrazine sulfate and 50.4 g. of potassium hydroxide in 125 ml. of water. About 60 ml. of ethanol was added to the mixture which was allowed to stand at room temperature for about fifteen hours. The orange solid which had precipitated was removed by filtration and to the filtrate, maintained at 0° C., was added 20.7 g. of sodium nitrite followed by 200 ml. of hydrochloric acid (100 ml. of concentrated acid and 100 ml. of water) added dropwise below the surface of the liquid. The mixture was stirred for about fifteen minutes after the addition of acid was complete, and the solid which had formed was collected by filtration and washed with water. The crude product was dissolved in potassium carbonate solution, decolorized with charcoal and reprecipitated by acidification with hydrochloric acid. The product was collected and recrystallized from absolute ethanol, giving 20 g. of 5-(3,4-methylenedioxyphenyl)tetrazole, M. P. 253–255° C. (dec.).

*Analysis.*—Calcd. for $C_8H_6N_4O_2$: C, 50.52; H, 3.18; N, 29.47. Found: C, 50.81; H, 3.33; N, 28.95.

(c) 2 - (2 - dimethylaminoethyl) - 5 - (3,4 - methylenedioxyphenyl)tetrazole was prepared from 8.5 g. of 5-(3,4-methylenedioxyphenyl)tetrazole and 6.48 g. of dimethylaminoethyl chloride hydrochloride, and converted to the hydrochloride and methiodide salt forms by the manipulative procedures described above in Example 1.

2 - (2 - dimethylaminoethyl) - 5 - (3,4 - methylenedioxyphenyl)tetrazole in the form of the hydrochloride salt had the M. P. 229–231° C. when recrystallized from ethanol.

*Analysis.*—Calcd. for $C_{12}H_{16}ClN_5O_2$: C, 48.40; H, 5.42; Cl, 11.91. Found: C, 48.35; H, 5.55; Cl, 11.75.

2 - (2 - dimethylaminoethyl) - 5 - (3,4 - methylenedioxyphenyl)tetrazole in the form of the methiodide salt had the M. P. 232° C. (dec.) when recrystallized first from ethanol and then from water.

*Analysis.*—Calcd. for $C_{13}H_{18}IN_5O_2$: C, 38.73; H, 4.50; I, 31.48. Found: C, 38.64; H, 4.61; I, 31.24.

EXAMPLE 10

2 - (2 - dibutylaminoethyl) - 5 - (3,4 - methylenedioxyphenyl)tetrazole was prepared from 9.5 g. of 5-(3,4-methylenedioxyphenyl)tetrazole, prepared as described above in Example 9, and 9.6 g. of 2-dibutylaminoethyl chloride, and converted to the hydrochloride salt form by the manipulative procedures described above in Example 1. The free base was distilled at 228–230° C. (0.9 mm.).

2 - (2 - dibutylaminoethyl) - 5 - (3,4 - methylenedioxyphenyl)tetrazole in the form of the hydrochloride salt had the M. P. 112–113.5° C. when recrystallized from an acetone-ether mixture.

*Analysis.*—Calcd. for $C_{18}H_{28}ClN_5O_2$: C, 56.61; H, 7.39; Cl, 9.29. Found: C, 56.61; H, 7.12; Cl, 9.22.

EXAMPLE 11

2 - (2 - dimethylaminoethyl) - 5 - (4 - nitrophenyl)tetrazole was prepared from 9.6 g. of 5-(4-nitrophenyl)tetrazole and 7.9 g. of 2-dimethylaminoethyl chloride hydrochloride, and converted to the hydrochloride and methiodide salt forms by the manipulative procedures described above in Example 1.

2 - (2 - dimethylaminoethyl) - 5 - (4 - nitrophenyl)tetrazole in the form of the hydrochloride salt had the M. P. 224–225° C. when recrystallized first from ethanol and then from isopropyl alcohol.

*Analysis.*—Calcd. for $C_{11}H_{15}ClN_6O_2$: C, 44.22; H, 5.06; Cl, 11.87. Found: C, 44.80; H, 5.48; Cl, 11.72.

2 - (2 - dimethylaminoethyl) - 5 - (4 - nitrophenyl)tetrazole in the form of the methiodide salt had the M. P. 234–235° C. when recrystallized from water.

*Analysis.*—Calcd. for $C_{12}H_{17}IN_6O_2$: C, 35.66; H, 4.24; N, 20.79. Found: C, 35.75; H, 4.54; N, 20.42.

EXAMPLE 12

(a) 1-(2-chloroethyl)-5-phenyltetrazole 2-benzamidoethanol (16.6 g., 0.1 mole) was suspended in thionyl chloride (47.6 g., 0.4 mole) and maintained below 40° C. until solution was effected. After warming gently on a water-bath for 3 hours the excess thionyl chloride was removed in vacuo. The residual N-2-chloroethylbenzimidyl chloride was dissolved in dry benzene (150 ml.), a 4% solution of hydrazoic acid in benzene (100 ml.) was added all at once and the mixture warmed at 75° C. until the moderate evolution of hydrogen chloride stopped. The solvent was removed in vacuo, and water (150 ml.) was added to the orange residue. After heating on a steam-bath for 30 minutes, the organic material was extracted with benzene and dried azeotropically. The oily residue foamed so excessively that distillation was not attempted and the oil comprising 1-(2-chloroethyl)-5-phenyltetrazole was used directly in the following amination reaction.

(b) 1-[2-(1-piperidylethyl)]-5-phenyltetrazole 1-(2-chloroethyl)5-phenyltetrazole (2.1 g.), piperidine (15 ml.) and benzene (100 ml.) were refluxed for 3.5 hours. After concentrating the reaction mixture to dryness in vacuo, the residue was extracted with dilute hydrochloric acid. The acidic extract was treated with charcoal and then made strongly alkaline. The oil that formed was extracted with benzene, dried azeotropically and then treated with alcoholic hydrogen chloride. The white gum which came down was triturated with isopropyl alcohol and there was obtained 0.7 g. (24%) of 1-[2-(1-piperidylethyl)]-5-phenyltetrazole in the form of the hydrochloride salt as white crystals, M. P. 213.5–215.5° C.

*Analysis.*—Calcd. for $C_{14}H_{20}ClN_5$: C, 57.23; H, 6.86; Cl, 12.07. Found: C, 57.37; H, 6.67; Cl, 12.10.

In the foregoing procedure, instead of piperidine there can be employed dimethylamine, diethylamine, ethylmethylamine, 2-methylpyrrolidine, and the like to give respectively 1-(2-dimethylaminoethyl)-5-phenyltatrazole, 1 - (2 - diethylaminoethyl)-5-phenyltetrazole, 1-(2-ethylmethylaminoethyl) - 5-phenyltetrazole, 1-[2-(2-methyl-1-pyrrolidyl)ethyl]-5-phenyltetrazole, and the like.

EXAMPLE 13

2 - (2 - dihexylaminoethyl) - 5 - (p - chlorophenyl)tetrazole can be prepared from 5-(p-chlorophenyl)tetrazole and 2-dihexylaminoethyl chloride according to the manipulative procedure described above in Example 1.

EXAMPLE 14

2 - [2 - (1 - pyrrolidyl)ethyl] - 5 - (3,4,5 - trimethoxyphenyl)tetrazole can be prepared from 5-(3,4,5-trimethoxyphenyl)tetrazole and 2-(1-pyrrolidyl)ethyl chloride by the manipulative procedure described above in Example 1.

EXAMPLE 15

2 - [3 - (2 - methyl - 1 - piperidyl) - 2 - methylpropyl]-5-phenyltetrazole can be prepared from 5-phenyltetrazole and 3 - (2 - methyl-1-piperidyl)-2-methylpropyl chloride by the manipulative procedure described above in Example 1.

I claim:

1. A member of the group consisting of: (A), a compound having the formula

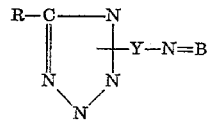

said formula containing an additional double bond in the ring in a position allylic to the side chain Y—N=B, and wherein R is a member of the class consisting of phenyl, cyclohexyl and thienyl radicals, and phenyl radicals substituted by from one to three groups selected from the group consisting of lower-alkyl, lower-alkoxy, halogen and nitro groups, Y is a lower-alkylene radical in which the free valences are on different carbon atoms, and —N=B is a tertiary-amino group selected from the class consisting of di-lower-alkylamino, 1-piperidyl, 4-morpholinyl and 1-pyrrolidyl, and lower-alkylated derivatives thereof; (B), the pharmaceutically acceptable acid addition salts thereof; and (C), the pharmaceutically acceptable quaternary ammonium salts thereof.

2. A pharmaceutically acceptable acid addition salt of a compound having the formula

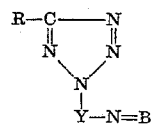

wherein R is a phenyl radical, Y is a lower-alkylene radical in which the free valences are on different carbon atoms, and —N=B is a di-lower-alkylamino radical.

3. A pharmaceutically acceptable acid addition salt of a compound having the formula

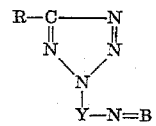

wherein R is a phenyl radical, Y is a lower-alkylene radical in which the free valences are on different carbon atoms, and —N=B is a 4-morpholinyl radical.

4. A pharmaceutically acceptable acid addition salt of a compound having the formula

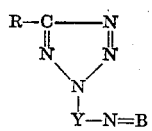

wherein R is a thienyl radical, Y is a lower-alkylene radical in which the free valences are on different carbon atoms, and —N=B is a di-lower-alkylamino radical.

5. A pharmaceutically acceptable acid addition salt of a compound having the formula

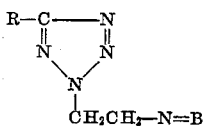

wherein R is a phenyl radical and —N=B is a di-lower-alkylamino radical.

6. A pharmaceutically acceptable acid addition salt of a compound having the formula

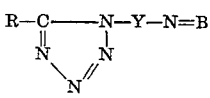

wherein R is a phenyl radical, Y is a lower-alkylene radical in which the free valences are on different carbon atoms, and —N=B is a 1-piperidyl radical.

7. A pharmaceutically acceptable acid addition salt of 2-[2-(1-piperidyl)ethyl]-5-phenyltetrazole.

8. A pharmaceutically acceptable acid addition salt of 2-(2-diethylaminoethyl)-5-phenyltetrazole.

9. A pharmaceutically acceptable acid addition salt of 2-[2-(4-morpholinyl)ethyl]-5-phenyltetrazole.

10. A pharmaceutically acceptable acid addition salt of 2-(2-dimethylaminoethyl)-5-(2-thienyl)tetrazole.

11. A pharmaceutically acceptable acid addition salt of 1-[2-(1-piperidyl)ethyl]-5-phenyltetrazole.

12. A process for preparing a compound having the formula

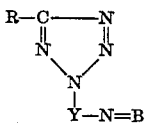

wherein R is a member of the class consisting of phenyl, cyclohexyl and thienyl radicals, and phenyl radicals substituted by from one to three groups selected from the group consisting of lower-alkyl, lower-alkoxy, halogen and nitro groups, Y is a lower-alkylene radical in which the free valences are on different carbon atoms, and —N=B is a tertiary-amino group selected from the class consisting of di-lower-alkylamino, 1-piperidyl, 4-morpholinyl and 1-pyrrolidyl, and lower-alkylated derivatives thereof, which comprises heating a compound having the formula

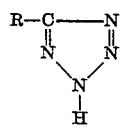

with a tertiary-aminoalkyl compound of the formula X—Y—N=B, wherein X is an acid radical derived by removal of an ionizable hydrogen from a strong acid, in the presence of a strong base.

13. A process for preparing a compound having the formula

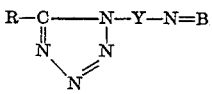

wherein R is a member of the class consisting of phenyl and thienyl radicals, and phenyl radicals substituted by from one to three groups selected from the group consisting of lower-alkyl, lower-alkoxy, halogen and nitro groups, Y is a lower-alkylene radical in which the free valences are on different carbon atoms, and —N=B is a tertiary-amino group selected from the class consisting of di-lower-alkylamino, 1-piperidyl, 4-morpholinyl and 1-pyrrolidyl, and lower-alkylated derivatives thereof, which comprises heating a compound having the formula

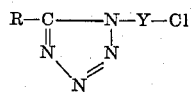

with a compound having the formula H—N=B.

14. A process for preparing a compound having the formula

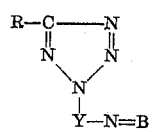

wherein R is a phenyl radical, Y is a lower-alkylene radical in which the free valences are on different carbon atoms, and —N=B is a di-lower-alkylamino radical, which comprises heating 5-phenyltetrazole with a di-lower-alkylamino-lower-alkyl halide in the presence of a strong base.

15. A process for preparing a compound having the formula

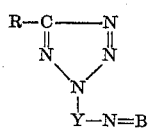

wherein R is a phenyl radical, Y is a lower-aklylene radical in which the free valences are on different carbon atoms, and —N=B is a 4-morpholinyl radical, which comprises heating 5-phenyltetrazole with a 4-morpholinyl-lower-alkyl halide in the presence of a strong base.

16. A process for preparing a compound having the formula

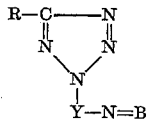

wherein R is a thienyl radical, Y is a lower-alkylene radical in which the free valences are on different carbon atoms, and —N=B is a di-lower-alkylamino radical, which comprises heating 5-thienyltetrazole with a di-lower-alkylamino-lower-alkyl halide in the presence of a strong base.

17. A process for preparing a compound having the formula

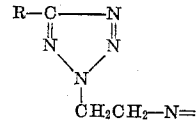

wherein R is a phenyl radical and —N=B is a di-lower-alkylamino radical, which comprises heating 5-phenyltetrazole with a 2-(di-lower-alkylamino)ethyl halide in the presence of a strong base.

18. A process for preparing a compound having the formula

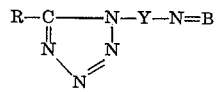

wherein R is a phenyl radical, Y is a lower-alkylene radical in which the free valences are on different carbon atoms, and —N=B is a 1-piperidyl radical, which comprises heating a 1-(chloroalkyl)-5-phenyltetrazole with piperidine.

19. A process for preparing 2-[2-(1-piperidyl)ethyl]-5-phenyltetrazole which comprises heating 5-phenyltetrazole with a 2-(1-piperidyl)ethyl halide in the presence of a strong base.

20. A process for preparing 2-(2-diethylaminoethyl)-5-phenyltetrazole which comprises heating 5-phenyltetrazole with a 2-diethylaminoethyl halide in the presence of a strong base.

21. A process for preparing 2 - [2-(4-morpholinyl)ethyl] - 5 - phenyltetrazole which comprises heating 5-phenyltetrazole with a 2-(4-morpholinyl)ethyl halide in the presence of a strong base.

22. A process for preparing 2 - (2 - dimethylaminoethyl) - 5 - (2 - thienyl)tetrazole which comprises heating 5 - (2 - thienyl)tetrazole with a 2 - dimethylaminoethyl halide in the presence of a strong base.

23. A process for preparing 1-[2-(1-piperidyl)ethyl]-5-phenyltetrazole which comprises heating 1-(2-chloroethyl)-5-phenyltetrazole with piperidine.

References Cited in the file of this patent

UNITED STATES PATENTS 2,470,085  Harvill _____ May 17, 1949

OTHER REFERENCES

Harvill et. al.: Jour. Org. Chem., vol. 17, pages 1597–1616 (1952).

UNITED STATES PATENT OFFICE
Certificate of Correction

Patent No. 2,852,515                                                           September 16, 1958

Bill Elpern

It is hereby certified that error appears in the printed specification of the above numbered patent requiring correction and that the said Letters Patent should read as corrected below.

Column 1, lines 40 to 43, Formula II should appear as shown below instead of as in the patent:

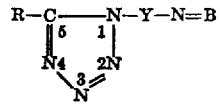

column 4, line 29, for "2-[2-(piperidyl)" read —2-[2-(1-piperidyl)—; line 30, for "5-phenyltetrazone" read —5-phenyltetrazole—; column 8, line 6, for "-5-phenyltatrazole" read— -5-phenyltetrazole —; column 10, line 35, for "lower-aklylene" read —lower-alkylene—.

Signed and sealed this 7th day of April 1959.

[SEAL]

Attest:
KARL H. AXLINE,
*Attesting Officer.*
                                                 ROBERT C. WATSON,
                                                 *Commissioner of Patents.*